(12) United States Patent
Keilman et al.

(10) Patent No.: US 8,033,177 B2
(45) Date of Patent: Oct. 11, 2011

(54) MEMS PRESSURE SENSOR AND HOUSING THEREFOR

(75) Inventors: George Keilman, Woodinville, WA (US); Tim Johnson, Woodinville, WA (US)

(73) Assignee: Pacesetter, Inc., Sylmar, CA (US)

( * ) Notice: Subject to any disclaimer, the term of this patent is extended or adjusted under 35 U.S.C. 154(b) by 355 days.

(21) Appl. No.: 12/367,689

(22) Filed: Feb. 9, 2009

(65) Prior Publication Data

US 2009/0205432 A1  Aug. 20, 2009

Related U.S. Application Data

(60) Provisional application No. 61/029,211, filed on Feb. 15, 2008.

(51) Int. Cl.
*G01L 9/12* (2006.01)
(52) U.S. Cl. ............................................. 73/718; 73/715
(58) Field of Classification Search ........................ None
See application file for complete search history.

(56) References Cited

U.S. PATENT DOCUMENTS

| | | | | |
|---|---|---|---|---|
| 6,869,818 B2 * | 3/2005 | Harris et al. | ..................... | 438/50 |
| 7,004,034 B2 * | 2/2006 | Chen | ................................ | 73/724 |
| 7,011,288 B1 * | 3/2006 | Slicker et al. | .................... | 251/11 |
| 7,125,739 B2 * | 10/2006 | Harris et al. | ..................... | 438/50 |
| 7,162,926 B1 * | 1/2007 | Guziak et al. | ................ | 73/729.2 |

* cited by examiner

*Primary Examiner* — Lisa Caputo
*Assistant Examiner* — Jermaine Jenkins

(57) ABSTRACT

A pressure sensing system positions a microelectromechanical (MEMS) diaphragm of a MEMS pressure sensor die in a housing to indirectly sample pressure state of a fluid being measured. A second housing diaphragm is used to make direct contact with the fluid being measured. Pressure state of the fluid being measured is transferred from the housing diaphragm through an electrically insulating intermediary fluid to the MEMS diaphragm thereby allowing the MEMS pressure sensor die to indirectly sample pressure state of the fluid being measured. Electrically conductive support members and electrically conductive solid vias are used to electrically couple circuitry of the MEMS pressure sensor die to external wires outside the housing.

5 Claims, 5 Drawing Sheets

MEMS PRESSURE SENSOR AND HOUSING THEREFOR

BACKGROUND OF THE INVENTION

1. Field of the Invention

The present invention is directed generally to pressure sensors.

2. Description of the Related Art

Versions of microelectromechanical systems (MEMS) can determine pressure levels of a fluid being measured and can be especially useful due to their small size. MEMS pressure sensor dies typically have a MEMS diaphragm fabricated to be integrated in the MEMS die and are typically positioned to directly contact the fluid being measured. In some situations, a MEMS diaphragm may not be compatible with the particular environment and/or the fluid being measured. In other cases the MEMS pressure sensor die may be part of other components sharing a common package. These situations can reduce the desirability of the MEMS diaphragm directly contacting the fluid being measured.

DETAILED DESCRIPTION OF THE INVENTION

As described herein, a pressure sensing system is used to position a MEMS diaphragm of a MEMS pressure sensor die in a housing to indirectly sample pressure state of a fluid being measured. A second housing diaphragm is used to make direct contact with the fluid being measured. Pressure state of the fluid being measured is transferred from the housing diaphragm in direct contact through an electrically insulating intermediary fluid to the MEMS diaphragm thereby allowing the MEMS pressure sensor die to indirectly sample pressure state of the fluid being measured. Electrically conductive support members and electrically conductive solid vias are used to electrically couple circuitry outside the housing.

Figure 1:
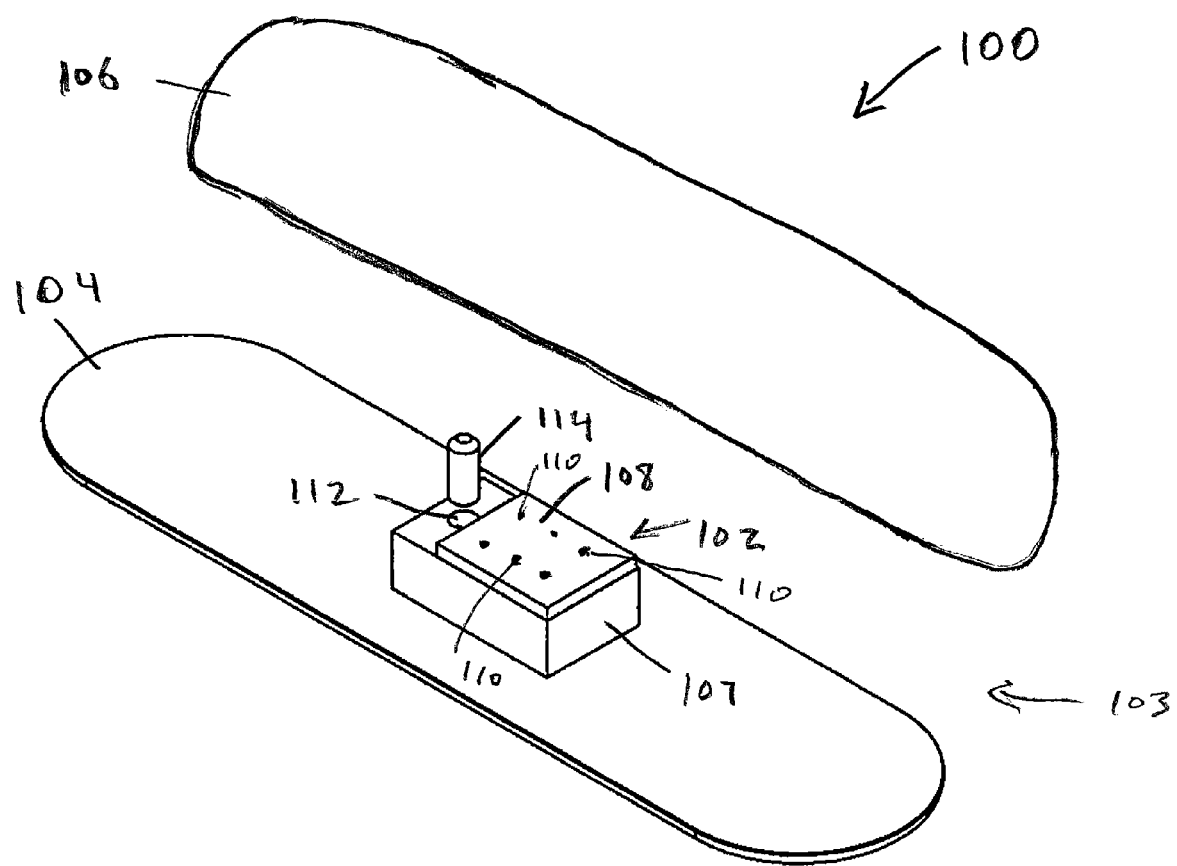
FIG. 1 is a perspective view of a pressure sensing system with the cover removed.

An exemplary pressure sensing system 100 is depicted in FIG. 1 as having a pressure sensing assembly 102 enclosed by a component package 103 having a package base 104 and a cover 106 shaped to sealably coupled with the package base. In some implementations, the package base 104 can be made from a substrate material. The pressure sensing assembly 102 is integrally jointed with the package base 104 with a portion of the package base serving as a wall for the pressure sensing assembly 102. The pressure sensing assembly 102 includes a housing 107 with a housing cover 108 having an exterior surface 108a, an interior surface 108b, and conductive solid vias 110 extending therebetween (better shown in FIG. 4). The housing 107 can be formed from ceramic and attached to the package base 104 with epoxy, silicone, brazing, or other attachment means. Alternatively, the housing 107 can be formed from metal and attached to the package base 104 with epoxy, silicone, brazing, laser welding, or other attachment means. As depicted, the housing cover 108 can be a hybrid printed circuit board formed from glass, ceramic, or other mechanically stable material compatible with technology involving printed circuitry. The housing cover 108 can be sealed to the housing 107 such as with epoxy, silicone, or braze. The housing 107 also includes a plug hole 112 sized to receive a plug 114.

Figure 2:
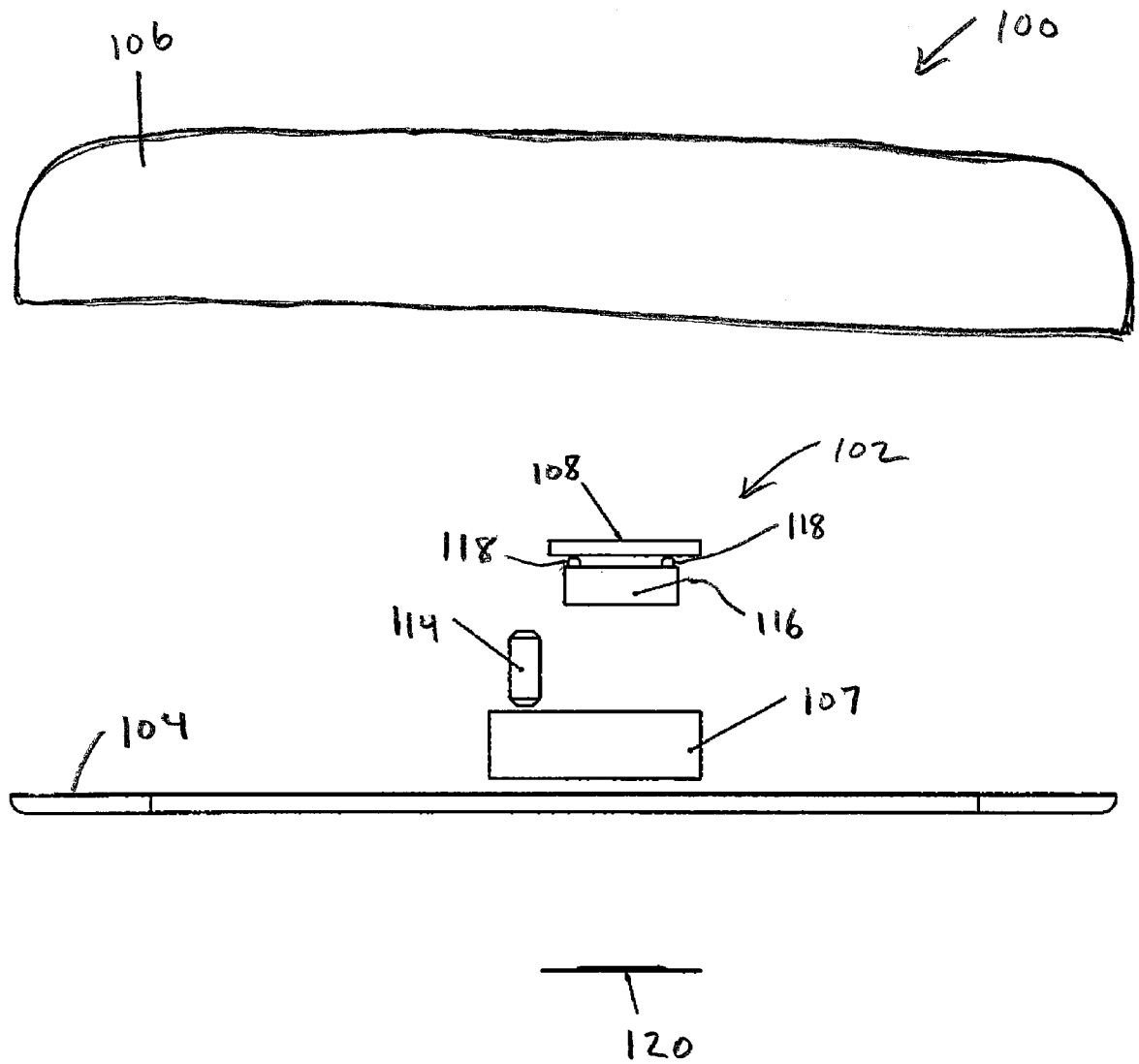
FIG. 2 is an exploded side elevational view of the pressure sensing system of FIG. 1.

As shown in FIG. 2, the pressure sensing assembly 102 further includes a MEMS pressure sensor die 116 that is in electrical contact with electrically conductive support members 118, which in turn are in electrical contact with the electrically conductive solid vias 110 further discussed below. The MEMS pressure sensor die 116 can be designed to determine fluid pressure levels either through capacitive or piezoresistive means. The conductive support members 118 also mechanically couple the MEMS pressure sensor die 116 to the housing cover 108. In some implementations, portions of solder, such as solder bumps, are used for the conductive support members 118. Also shown in FIG. 2 as included with the pressure sensing assembly 102 is a housing diaphragm 120 that is positioned to seal a housing aperture 121 shown in cross-section in FIG. 4, in that portion of the package base 104 that serves as a wall of the pressure sensing assembly. The housing diaphragm 120 can be attached to the package base 104 by laser welding, epoxy, silicone, electrochemical bonding, electrochemical forming, brazing or other means. The housing diaphragm 120 has an exterior surface 120a to contact a fluid being measured that has a pressure value that is desired to be known and an oppositely facing interior surface 120b.

Figure 3:
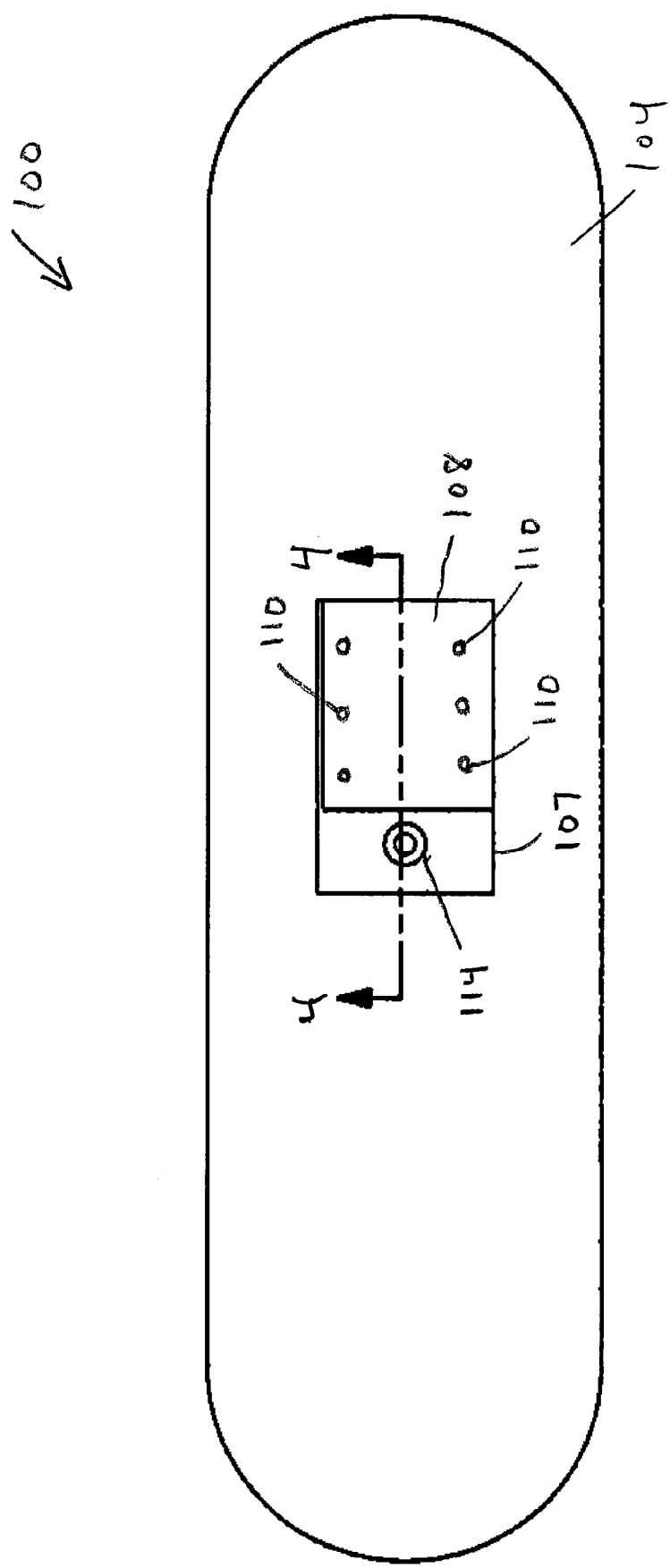
FIG. 3 is an enlarged top plan view of the pressure sensing system of FIG. 1 without the cover.
Figure 4:
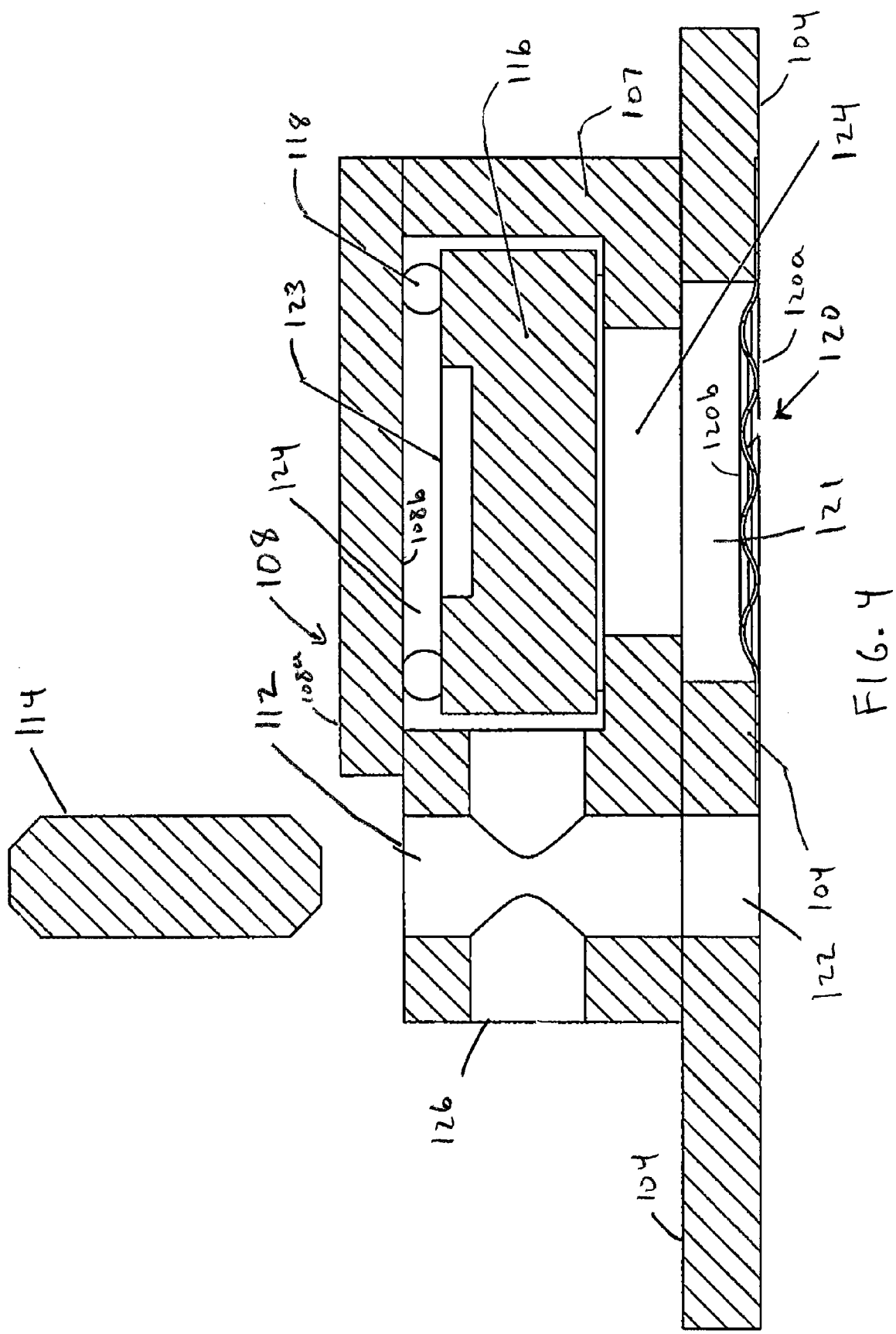
FIG. 4 is a cross-sectional view of the pressure sensing system taken substantially along line 4-4 of FIG. 3.

As indicated in FIG. 3, a cross-sectional view of the pressure sensing assembly 102 is found in FIG. 4 showing the package base 104 to have a plug aperture 122 communicating with the plug hole 112. As is shown, the MEMS pressure sensor die 116 has a MEMS diaphragm 123 in communication with a chamber 124 defined in part by the package base 104, the housing 107, and the housing cover 108. The chamber 124 contains an intermediary fluid 125, which is used to transfer pressure applied to the exterior surface 120a of the housing diaphragm 120 to the MEMS diaphragm 123. A fill port 126 is also in communication with the chamber 124 when the plug 114 is removed from the plug hole 112 to fill the chamber with the intermediary fluid 12. The fill port 126 can be machined in the housing 107 and provides access to the chamber 124. The plug hole 112 can be drilled in the housing 107 to receive the plug 114, which is used to seal the fill port 126 and the chamber 124 after the chamber has been filled with the intermediary fluid. The plug 114 can be made as a stop cork or other device to seal the fill port 126 and the chamber 124 as long as the volume of the sealed chamber has the same value each time the chamber is sealed.

Figure 5:
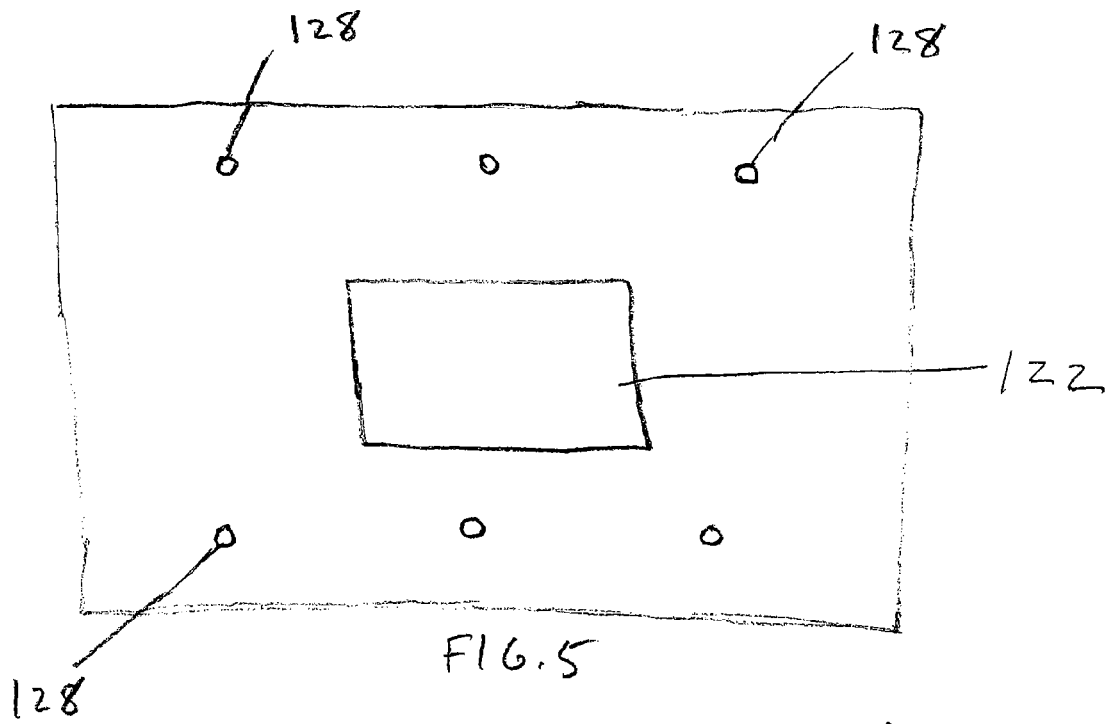
FIG. 5 is a top plan view of a MEMS pressure sensing die of the pressure sensing system of FIG. 1.
Figure 6:
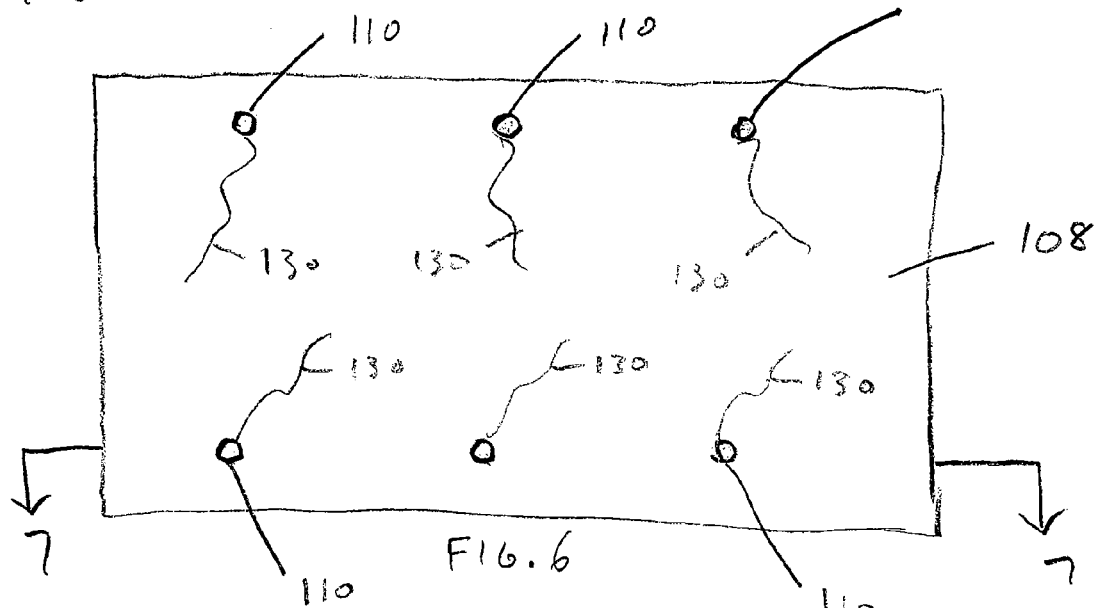
FIG. 6 is a top plan view of a sensor containment cover of the pressure sensing system of FIG. 1.
Figure 7:
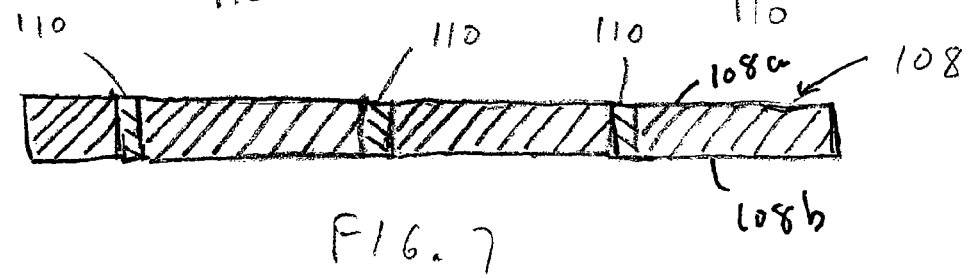
FIG. 7 is a cross-sectional view of the sensor containment cover taken substantially along line 7-7 of FIG. 6.

The MEMS pressure sensor die 116 is shown in FIG. 5 to include electrical circuitry contacts 128 used for electrical communication with the MEMS pressure sensor die, such as to output pressure values or status information from the MEMS pressure sensor die or to input control signals to the MEMS pressure sensor die. The circuitry contacts 128 of the MEMS pressure sensor die 116 are aligned with the conductive solid vias 110 in the housing cover 108, better shown in FIGS. 6 and 7, to conduct the electrical communication with the MEMS pressure sensor die outside of the housing 107. The conductive solid core vias 110 of the housing cover 108 act as sealed electrical feedthrough interconnects between the exterior surface 108a and the interior surface 108b, which is electrically coupled to the electrical circuitry contacts 128 of the MEMS pressure sensor die 116 through the conductive support members 118. External wires 130 are attached to the external surface 108a of the conductive vias 110 with solder, wire bond, conductive epoxy or other electrical bonding method.

In operation, the chamber 124 is filled with an intermediary fluid that is electrically insulating, such as a silicone based fluid such as silicone oil or other insulator based fluid.

The chamber 124 can be vacuum filled with silicone oil by immersing the entire pressure sensing assembly 102 in the silicone oil, placing the immersed pressure sensing assembly in a vacuum, and then drawing the air out of the chamber 124. The plug 114 can then be inserted into the plug hole 112 to seal off the chamber 124. Alternately, an additional plug hole 112 and an additional fill port 126 can be used as a vent to introduce pressurized silicone oil or other pressurized fluid in the chamber 124. After filling the chamber 124, all of the plug holes 112 each would be sealed with one of the plugs 114.

External fluid pressure impinging upon the exterior surface 120a of the housing diaphragm 120 sealing the housing aperture 121 of the package base 104 is transferred to the intermediary fluid in the chamber 124 through the housing diaphragm whereby the MEMS diaphragm is affected and the MEMS pressure sensor die senses a pressure level corresponding to the external fluid pressure.

There are three concepts regarding a MEMS pressure sensor further discussed below. The sensor has an external diaphragm in contact with an test environment in which a measurement of the pressure of the test environment is desired. The sensor also has a MEMS device that translates pressure into something like a voltage to be measured. An incompressible internal fluid such as an oil is positioned between the diaphragm and the MEMS. The problem with conventional MEMS pressure sensors is that a temperature change of the internal fluid changes the pressure of the internal fluid regardless of whether there has been a change in pressure of the test environment. Inventive concepts to address these issues are discussed further below.

Outline of Concepts:
Methods for Decreasing Fluid Expansion (Due to CTE) in MEMS Pressure Sensor Enclosure
1. Stop fluid from expanding
   a. keep cool (Peltier device)
   b. zero-CTE fluid (ref Kavlico conversation)
2. Control the volume using other volumes within fluid
   a. Negative CTE material in volume (block, powder)
   b. Piezoelectric (fill with the PZT material expanded, then contract leaving negative displacement on diaphragm)
3. Expand the volume enclosing MEMS sensor and fluid
   a. Dual CTE bi-laminar diaphragm
   b. Thermally activated (CTE) expanding housing
   c. Electromechanically activated expanding housing (NiTi, PZT)
   d. Mechanical
      i. Bi-stable state mechanical diaphragm
      ii. Bellows Description The invention consists of methods to decrease the errors in pressure sensors due to thermal expansion differences between sensor components.

Background

A typical method for constructing a pressure sensor for use in corrosive or harsh environments utilizes a small sensing element such as a piezoresistive or capacitive micro-machined electromechanical (MEMS) die sealed into a larger housing containing an electrically insulating isolation fluid such as a silicone oil or other type of synthetic oil such as a hydraulic fluid. This housing is constructed with an isolation diaphragm or membrane to transmit pressure from the external environment, through the minimally compressible isolation fluid, to the sensing element. The isolation diaphragm must move freely over the operating pressure range and also over the operating temperature range so that it does not introduce a significant pressure differential, which would result in an error in the pressure reading. In addition, the diaphragm material must be maintained in a linear, elastic region, as opposed to a plastic region, as it is deformed, so that its behavior does not change over temperature and pressure cycles, altering the calibration of the sensor.

One issue encountered with this construction is that the isolation fluid expands volumetrically with increasing temperature at a rate higher than the housing, resulting in an outward pressure on the diaphragm. The amount of fluid expansion is characterized by the coefficient of thermal expansion (CTE) for the fluid. In industrial pressure sensor, the isolation diaphragm is typically constructed with a large area compared to the volume of the contained fluid, minimizing the deflection of the diaphragm and thereby minimizing the amount of strain within the diaphragm material. Alternately or in addition, bellows or corrugated diaphragms are used on industrial sensors to allow the isolation diaphragm to move over a larger distance while keeping the diaphragm materials in a linear, purely elastic range and minimizing the developed differential pressure across the diaphragm. This in turn allows high operating and manufacturing temperatures without plastically deforming the isolation diaphragm. Unfortunately, this technique does not scale well when the pressure sensor is miniaturized for uses in small transducer applications, for example when the pressure sensor is intended for implantation into the human body, or in industrial applications where it is often desirable to miniaturize the sensor. In these cases, the isolation diaphragm area becomes small compared to the volume of contained fluid. When the sensor is scaled to dimensions of around 1 mm×2 mm×3 mm, the temperature is then limited to below around 60° C. Many fabrication processes involve higher temperatures, such as the elevated temperature required to fully cure epoxy or other thermosets. In addition, standard methods for sterilizing medical devices also utilize process temperatures, exceeding 60° C.

One method to mitigate this effect utilizes a zero-CTE fluid and is reportedly in development by Kavlico.

There are a number of ways to compensate for the fluid expansion in the housing. These can be classified into 3 general categories:
1) Minimize the fluid expansion with increasing environmental temperature
2) Enclose a separate material that decreases volume when the temperature increases, for instance with a material with a negative thermal expansion coefficient
3) Design the sensor housing to expand in volume with increasing temperature Category 1:

The first category includes the concept under development by Kavlico, but also includes methods to keep the fluid cooler than the environment. For example a tiny heat-transfer device such as a Peltier cooler could be included to keep the local temperature (ie, the fluid) constant and keep the fluid from expanding. A Peltier cooler can either heat or cool, depending upon the direction of current flow, so it could provide a constant-temperature environment for the sensor in either high or low ambient temperature conditions. An active control loop, with a temperature sensor in the fluid, could maintain constant temperature.

Category 2:

The second category utilizes a volume of negative CTE material (U.S. Pat. No. 6,066,585). This material could be implemented as either a powder scattered around in the fluid, as a 3D volumetric block, or as a coating on the walls of the housing. The CTE of the material and the amount of the material could be balanced with the fluid CTE to provide minimal or zero net volume expansion with temperature.

An additional implementation could be a small block of piezoceramic (such as lead zirconate titanate, or PZT) or another material that is in an expanded state during the filling process. The material could be released back to its unexpanded state leaving a negative displacement on the diaphragm. The material could be mounted to the walls of the chamber. Here again, a temperature sensor in the fluid could be used to drive a control loop that would provide an output voltage to the piezoceramic element.

Category 3:

The third category includes several mechanical or electromechanical methods for increasing the chamber volume to match the expanding fluid volume. One method employs a bilaminar diaphragm composed of two materials with different thermal expansion coefficients (like a thermostat element). The diaphragm would expand outward as the temperature increased.

The expansion can also be activated with electromechancial force (ie, a piezoelectric bender element (unimorph or bimorph) or a NiTi (Nitinol) shape memory element). When the layers expand by different amounts the diaphragm bends outward compensating for the fluid expansion. This method could also be implemented by an arm or other micro-actuator attached to the diaphragm. Here again, a temperature sensor in the fluid could be used to drive a control loop that would provide an output voltage or current to control the active element.

Another method would expand the housing size, instead of or in addition to the diaphragm. A first method could use a housing material with a higher CTE to expand with increasing temperature. A second method could use a NiTi or piezoelectric washer (i.e., an annular structure that is integral to the housing) placed in the wall of the housing expanding the overall height. A control signal would likely be required to expand the housing when the temperature rises.

Yet another method might also be to use a bistable state diaphragm (like an oil can bottom). During filling the diaphragm could minimize the volume of the fluid, and could be pulled or snapped into a position that minimizes the volume when exposed to higher temperatures. The diaphragm could then be pushed back into its original state after exposure to the high fabrication process temperature. This could also be implemented with a plug or bellows rather than a diaphragm.

From the foregoing it will be appreciated that, although specific implementations have been described herein for purposes of illustration, various modifications may be made without deviating from the spirit and scope of the invention.

We claim:

1. A system comprising:
a housing;
a housing cover with a plurality of electrically conductive solid vias therethrough;
a first diaphragm;
a chamber at least partially bounded by the housing the first diaphragm, and the housing cover;
electrically conductive support members; and
a microelectromechanical system (MEMS) pressure sensor with circuit contacts and a second diaphragm, the second diaphragm being in communication with the first diaphragm through the chamber, each of the electrically conductive support members being coupled with and positioned therebetween a different pair of the circuit contacts of the MEMS pressure sensor and the electrically conductive solid vias of the housing cover.

2. The system of claim 1 further comprising a plurality of wires, each coupled to a different one of the plurality of electrically conductive solid vias.

3. The system of claim 2 wherein the plurality of wires are coupled to the electrically conductive solid vias with solder.

4. The system of claim 2 wherein the plurality of wires are coupled to the electrically conductive solid vias with wire bond.

5. The system of claim 2 wherein the plurality of wires are coupled to the electrically conductive solid vias with conductive epoxy.

* * * * *